Jan. 27, 1942.  I. M. COLBETH  2,270,856
CONTINUOUS PROCESS OF SAPONIFICATION
Filed July 17, 1940
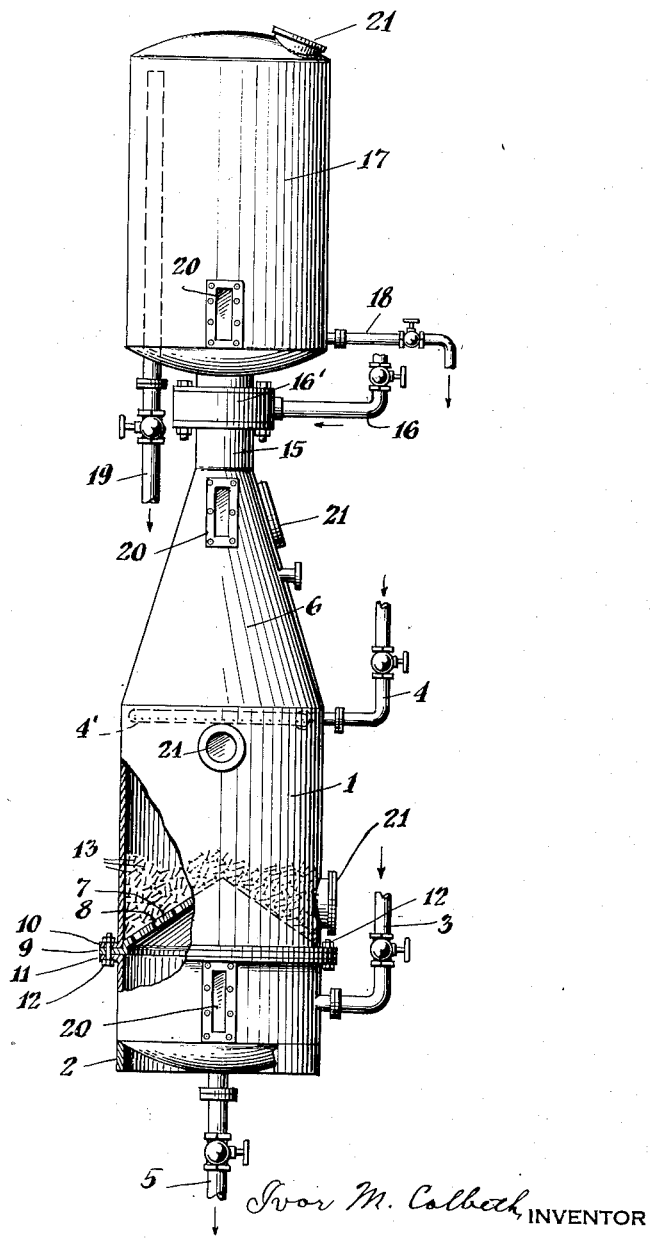
Ivor M. Colbeth, INVENTOR
BY
Charles W. Mortimer,
ATTORNEY Patented Jan. 27, 1942

2,270,856

UNITED STATES PATENT OFFICE 2,270,856

CONTINUOUS PROCESS OF SAPONIFICATION

Ivor M. Colbeth, East Orange, N. J., assignor to The Baker Castor Oil Company, New York, N. Y., a corporation of New Jersey Application July 17, 1940, Serial No. 346,026

6 Claims. (Cl. 260—417)

This invention relates to a process by means of which saponifications as well as hydrolysis can be carried out in a continuous manner or while subjecting a liquid stream containing saponifiable matter to the process and separating the saponified matter from the other constituents. The invention is particularly suitable for saponification of oils because the soap solution to be separated out has a specific gravity different from the other constituents.

This is a continuation-in-part and division-in-part of my application Serial No. 163,575, filed September 13, 1937; and reference is also made to my application Serial No. 94,135, filed August 4, 1936, and my Patent No. 2,183,486, December 12, 1939.

The invention will be particularly described in connection with saponification, and it will be understood that when hydrolysis is to be carried out suitable hydrolysing materials will be used.

In carrying out saponification in accordance with this invention any of the well known materials such as fish, animal or vegetable oils or esters such as glycerides, glycols, or esters of low or high molecular weight, monohydric alcohols and fatty acids suitable for being converted into soap or the alkali salt of the acid present corresponding to the saponifying agent that is used, can be passed continuously through a confined space and contacted therein with saponifying agents so that the soap is recovered in a rapid and economical manner. Sodium, potassium and ammonium are commonly used for saponifying agents, although other saponifying agents may be used.

The invention will be more particularly described in connection with an apparatus that has been found to be very useful and convenient in carrying out the process. A side view of this apparatus, partly broken away, is shown in the accompanying drawing in which reference character 1 indicates a chamber or container that may be mounted in any way, as for example upon a support 2, to keep it upright. A valved inlet 3 is connected to the lower portion of the chamber 1 and a valve inlet 4 is connected to a perforated ring 4' in the upper portion of the container 1. A valved outlet 5 is connected to the lower end of the chamber 1 and an extension 6 in the form of a truncated cone is provided at the upper end of this chamber.

A cone 7 or the like having perforations or holes 8 through it is located in the chamber 1 a short distance above the inlet 3. It may be provided with a flange 9 that can be clamped between flanges 10 and 11 on sections of the chamber 1 to keep this cone in place when the bolts 12 are tightened. Packing of elongated bodies having side extensions such as nails 13 or other objects, that will cause the liquid that enters through the inlet 3 to be retarded and divided into small drops as it passes upwardly through the mass of nails or other objects, is located in the chamber 1 above the cone 7.

A neck 15 or portion of considerably smaller cross section than the chamber 1 is provided at the upper end of the extension 6. A valved inlet pipe 16 for wash water enters the neck 15 tangentially through the portion 16' between its ends, and a settling or draw-off tank 17 is connected to the upper end of the neck 15. A valved outlet pipe 18 for excess water leads from the lower portion of the tank 17 and a valved outlet pipe 19 for the washed oil enters the lower portion of the tank 17 with its open upper end terminating a short distance below the upper end of this tank.

Sight glasses 20 for observation and hand holes 21 for cleaning or other purposes are provided at convenient places.

The valves in the pipes 3, 4, 5, 16 and 18 are regulated in accordance with the liquids used, so that the time of contact and sort of treatment will be that which is desired, as can be ascertained by inspection through the sight glasses 20 or by examination of the liquids from the outlet pipes.

In the description the term "oil" is intended to include saponifiable matter generally. If the oil is solid at room temperature, heat may be applied in any convenient way to keep it liquid.

While the process is in regular operation the speed of downward movement of the liquid used for washing is a maximum at the neck 15 and is at an approximately minimum constant speed in the lower part of the extension 6 and until it reaches the upper end of chamber 1, when the speed is increased as it joins the liquid entering through pipe 4 and still more while passing the nails and slows up beyond the nails. The speed of the oil is at a minimum through the nails as it apparently passes through the interstices and crawls along the surfaces of the nails. After it leaves the nails, its speed increases, but its speed is decreased farther up, due to the downward speed of the solution in the upper part of the neck 15.

Any portion of the oil which has not been saponified passes through the neck 15 and enters the chamber 17 where drops of water that may be carried along settle out and the water is drawn off through the pipe 18 while said oil passes out through the pipe 19. Water is discharged through the outlet 18 at such a rate as to maintain a suitable depth of oil in the portion 17 above the water therein to give time enough for drops of water to settle through the oil before it passes out through the outlet 19. The unsaponified portion may be again introduced through the pipe 3.

The following are given as specific examples to illustrate how the saponification process can be carried out in the apparatus shown in the drawing.

The following examples are given to illustrate the process and are not to be taken as limiting the same.

Example I

Soy bean oil is heated to about 200° F. and introduced into the lower portion of the chamber 1 through the inlet 3 and an aqueous solution of about 25 percent sodium hydroxide concentration heated to about about 200° F. is introduced through the inlet 4 and perforated ring 4' so that it is distributed over the entire area of the container 1 and is diluted by the descending wash water to about 12 percent. The oil, being lighter than the solution, rises, while the soap solution that is formed descends and passes out though the outlet 5. The soap is salted out of this solution by adding more of the saponifying agent and the mother liquor is heated and is again used in the process by passing it into the chamber 1 through the pipe 4. The incoming oil is divided into small droplets by the cone 7 and objects 13 so that the oil and saponifying agent are caused to come into such intimate contact that the saponification quickly takes place. The soap that is formed dissolves in the sodium hydroxide solution and is carried downwardly and out through the outlet pipe 5. The small amount of unsaponified oil passes upwardly through the neck 15 into the lower portion of the tank 17.

Wash water enters through the pipe 16 and portion 16' and effectively washes the small amount of unsaponified rising oil and causes many of the droplets to contact and coalesce into drops of larger size which rise into the tank 17 to form a layer. The valves in the inlet water pipe 16 and outlet water pipe 18 are so regulated that enough water enters to wash the oil, part of this water passing downwardly, another part of this water passing upwardly and forming a layer or column of water in the bottom of tank 17 into which the drops of water that may have been carried with the washed oil into the upper layer of oil in this tank 17 settle and are drawn off through the outlet pipe 19.

Example II

Butyl oleate is heated to 200° F. and introduced through the oil pipe 3, which is about five feet below the entrance point of the pipe 4 through which an aqueous solution of about 20 percent potassium hydroxide is introduced, using about twice the theoretical amount based upon the amount of ester treated, and the entrance of the wash water pipe 16 is five feet above the entrance point of this pipe 4. The depth of objects 13 through which the ester has to rise is three and one-half feet. The soap solution is drawn out through the pipe 5 at such a rate as to cause the droplets of ester above the objects 13 to rise very slowly.

An amount of KOH approximately equal to that introduced into the chamber 1 through the pipe 4 is added to the soap solution passing out through the pipe 5 to salt out the soap and the mother liquor is utilized as the saponifying material that is introduced through the inlet 4.

Example III

Bees wax is melted and the temperature raised to about 212° F. and introduced through the pipe 3 while a solution of approximately 20 percent of potassium hydroxide is introduced through the pipe 4. The potassium hydroxide solution should be heated to just short of its boiling point, and the process is carried through as described above.

Example IV

Chlorinated stearic acid is dissolved in toluol so as to obtain a liquid lighter than dilute sulphuric acid. It is introduced into the lower portion of the chamber 1 through the inlet 3, and an aqueous solution of sulphuric acid of approximately 25 percent strength is heated to just below the boiling point of the solution and is introduced through the inlet 4 and perforated ring 4' so that it is distributed over the entire container 1 and is diluted by the descending wash water to about 10 percent. The stearic acid in the toluol solution, being lighter than the sulphuric acid, rises through the neck 15 and comes into contact with the wash water which is introduced through the pipe 16 where it is thoroughly washed free from sulphuric acid and finally rises into the settling tank 17, having been converted into a hydroxy compound. The chlorinated stearic acid solution may be re-passed through the sulphuric acid solution as many times as may be necessary to insure complete hydrolysis of the chlorine group.

What is claimed is:

1. The continuous process of saponification, which comprises introducing a liquid stream containing saponifiable constituents into the lower portion of a confined space, causing said stream to divide into droplets soon after being introduced, introducing a stream of a concentrated solution of caustic alkali into a higher portion of said space and causing it to flow countercurrent to said droplets, and introducing more of the solvent for said alkali into a still higher portion of said space, while maintaining a temperature sufficiently high to cause saponification to take place.

2. The continuous process of saponification, which comprises introducing a liquid stream containing saponifiable constituents into the lower portion of a confined space, causing said stream to divide into droplets soon after being introduced, introducing a stream of a concentrated solution of caustic alkali into a higher portion of said space and causing it to flow countercurrent to said droplets, introducing more of the solvent for said alkali into a still higher portion of said space, while maintaining a temperature sufficiently high to cause saponification to take place, and washing the unsaponified portion of said stream.

3. The continuous process of saponification, which comprises introducing a liquid stream containing saponifiable constituents into the lower portion of a confined space, causing said stream to divide into droplets soon after being introduced, introducing a stream of a concentrated solution of caustic alkali into a higher portion of said space and causing it to flow countercurrent to said droplets, introducing more of the solvent for said alkali into a still higher portion of said space, while maintaining a temperature sufficiently high to cause saponification to take place, and controlling the velocity of rise of said droplets by regulating the amount of the alkali stream withdrawn at the bottom.

4. The continuous process of saponification, which comprises introducing a liquid stream containing saponifiable constituents into the lower portion of a confined space, causing said stream to divide into droplets soon after being introduced, introducing a stream of a concentrated solution of caustic alkali into a higher portion of said space and causing it to flow countercurrent to said droplets, and introducing more of the solvent for said alkali into a still higher portion of said space, while maintaining a temperature sufficiently high to cause saponification to take place, the concentration of said solution being sufficient to cause substantially complete saponification to take place by one passage through said space.

5. The continuous process of saponification, which comprises introducing a liquid stream containing saponifiable constituents into the lower portion of a confined space, causing said stream to divide into droplets soon after being introduced, introducing a stream of a concentrated solution of caustic alkali in dilute alcohol into a higher portion of said space and causing it to flow countercurrent to said droplets, and introducing more of the solvent for said alkali into a still higher portion of said space, while maintaining a temperature sufficiently high to cause saponification to take place.

6. The continuous process of hydrolysis which comprises introducing a liquid stream containing constituents that can be hydrolysed into the lower portion of a confined space, causing said stream to divide into droplets soon after being introduced, introducing a stream of an aqueous solution of mineral acid into a higher portion of said space and causing it to flow countercurrent to said droplets, introducing more water into a still higher portion of said space, while maintaining a temperature sufficiently high to cause hydrolysis to take place.

IVOR M. COLBETH.